Dec. 24, 1968

B. A. DREW 3,417,493

DEVICE FOR REPRESENTING MATHEMATICAL FUNCTIONS
IN THREE DIMENSIONS

Filed Nov. 8, 1966

INVENTOR.
BRUCE A. DREW

ATTORNEY

Dec. 24, 1968  B. A. DREW  3,417,493
DEVICE FOR REPRESENTING MATHEMATICAL FUNCTIONS
IN THREE DIMENSIONS
Filed Nov. 8, 1966  2 Sheets-Sheet 2

INVENTOR.
BRUCE A. DREW
BY
James V. Hornsey
ATTORNEY

# United States Patent Office 3,417,493
Patented Dec. 24, 1968

3,417,493
DEVICE FOR REPRESENTING MATHEMATICAL FUNCTIONS IN THREE DIMENSIONS
Bruce A. Drew, Minneapolis, Minn., assignor to The Pillsbury Company, Minneapolis, Minn., a corporation of Delaware
Filed Nov. 8, 1966, Ser. No. 592,772
3 Claims. (Cl. 35—30)

ABSTRACT OF THE DISCLOSURE

A device consisting of paper, paperboard or plastic sheet material for representing mathematical functions in three dimension. The unit consists of a base formed from sheet material to which a plurality of parallel marking surfaces are connected by means of a hinged joint. The marking surfaces are formed from transparent plastic sheets. An additional sheet is provided for holding the free ends of the marking surfaces at the proper spacing. Grids are printed upon the marking surfaces to facilitate the entry of data.

---

The present invention relates to a device for demonstrating and exhibiting mathematical data in three dimensions and particularly for demonstrating functions of three or four variables in either rectangular or tetrahedral coordinates.

Many functions can be represented in a single plane. Some, however, can only be represented clearly with the aid of three-dimensional models. It is, of course, possible to represent a group of curves side by side on a flat surface but in this case it is difficult to visualize the relationship and change in each curve from one plane to the next. Solid models have been available in which either rectangular or tetrahedral coordinates are used. These prior models were not only bulky and relatively expensive but were also time-consuming to assemble and prepare. The use of solid models has, therefore, been limited due to their large size and weight as well as the difficulty encountered in entering values and drawing curves on them.

Accordingly, the major objectives of the present invention are to provide models for demonstrating functions for homogeneous coordinates in three dimensions which are very compact, inexpensive, suited for mass production and in which the numerical values and curves can be quickly and conveniently entered. More specifically, it is an object to provide a function demonstrating device of the type described which is portable and can be folded flat and is well suited for storage in a folder or notebook. These and other objects will become apparent in the following specification and drawings wherein:

Briefly, the invention provides a demonstrating device formed from hinged sheets of flexible material such as plastic or paperboard and includes a base sheet, a plurality of parallel marking surfaces, all of which are hinged to the base and a spacer member connected to the parallel marking surfaces at predetermined intervals for maintaining the marking surfaces in parallel relationship whereby the entire device can be folded flat when the spacer is moved to a position adjacent the base.

Figure 1:
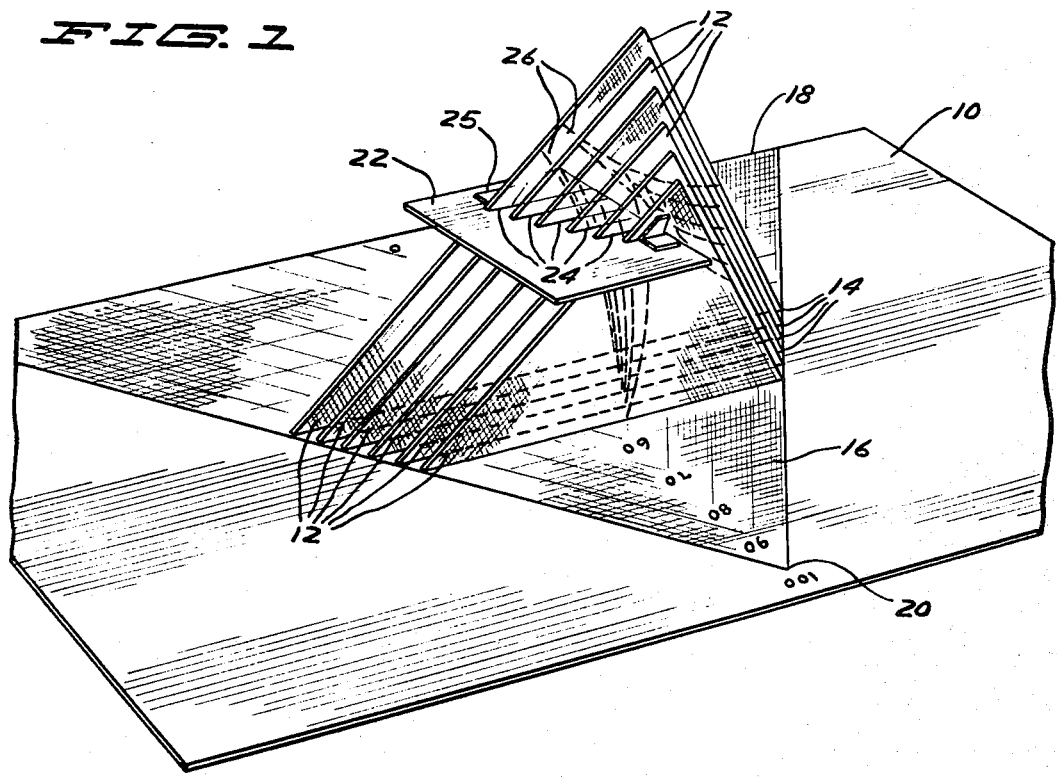
FIGURE 1 is a perspective view of one form of the invention as it appears when it is being used.
Figure 2:
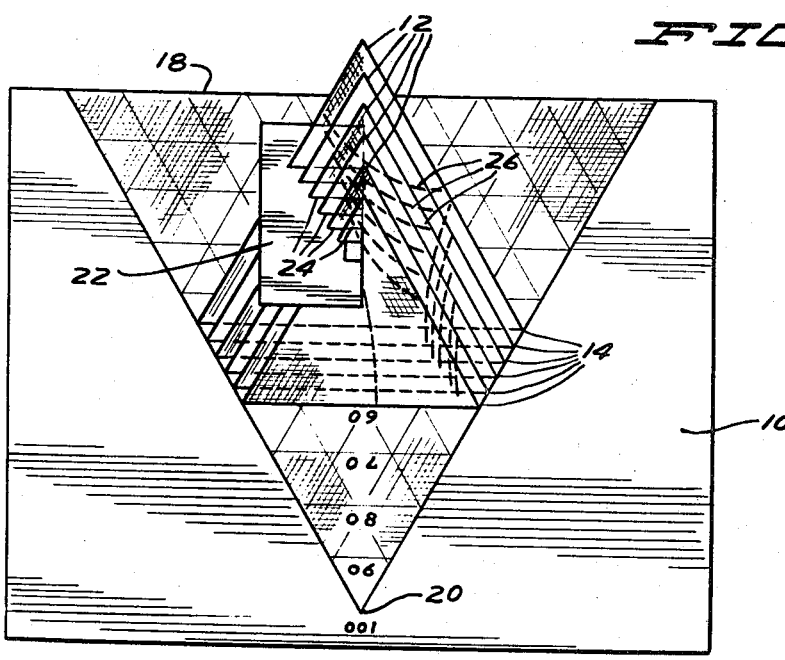
FIGURE 2 is a plan view of the device of FIGURE 1 when collapsed.

Referring now to FIGURES 1 and 2, there is shown a demonstrating device embodying the invention having a base 10 consisting of a sheet of paperboard to which is connected a plurality of marking surfaces 12 preferably formed from a relatively stiff transparent material such as polystyrene sheeting. The marking surfaces should have at least about the stiffness of a playing card, the only important requirement being that they do not sag to an objectionable degree when in use. Each of the surfaces 12 is connected to the base 10 along parallel lines by means of a hinge 14 which can be made either from an adhesive or with a strip of tape (not shown).

In the preferred form of the invention the base 10 has marked upon its upward surface a standard triangular coordinate grid 16 (usually equilateral) which may conveniently be marked with numerals and lines such that the height of each apex represents 100. In this way, any point on the grid 16 lies on three intersecting lines, each parallel with one base and the sum of the values corresponding to these lines is one hundred.

The parallel marking surfaces 12 are secured by the hinged connections 14 along lines which run parallel to the base 18 of grid 16. The hinged connections 14 are preferably equidistant from each other. Each of the marking surfaces 12, preferably but not necessarily, is triangular and corresponds in size to the portion of the grid 16 on the side of each respective surface 12 toward the apex 20 of the grid 16.

A spacer 22 is secured to the surfaces 12 at a plurality of connection points 24 which may be made by providing parallel cuts in the spacer 22. In this instance spacer 22 consists of a small sheet of paperboard. The connection points 24 are all equidistant from each other and have the same spacing as the hinged connections 14. The spacer 22 thus serves to maintain the marking surfaces 12 in parallel relationship. It should be noted that the spacer 22 is not necessarily fastened (as by adhesive or tabs, etc.) to any one of the surfaces 12. A piece of tape 25 can be used for this purpose when the device is ready for use. The spacer 22 can be secured to the surfaces 12 at any height above the base 10. In the example illustrated, the spacer 22 is parallel to the base 10. Each one of the surfaces 12 is also preferably marked with numerical values and lines to provide rectangular coordinates similar to the grid 16.

When the device is to be used, the spacer 22 is removed and one or more curves 26 is constructed upon each surface 12 and as each curve is finished that sheet is then folded to the right as seen in the figures so that the one beneath it can be constructed. The spacer 22 is then reattached and tape 25 is placed in position.

Figure 3:
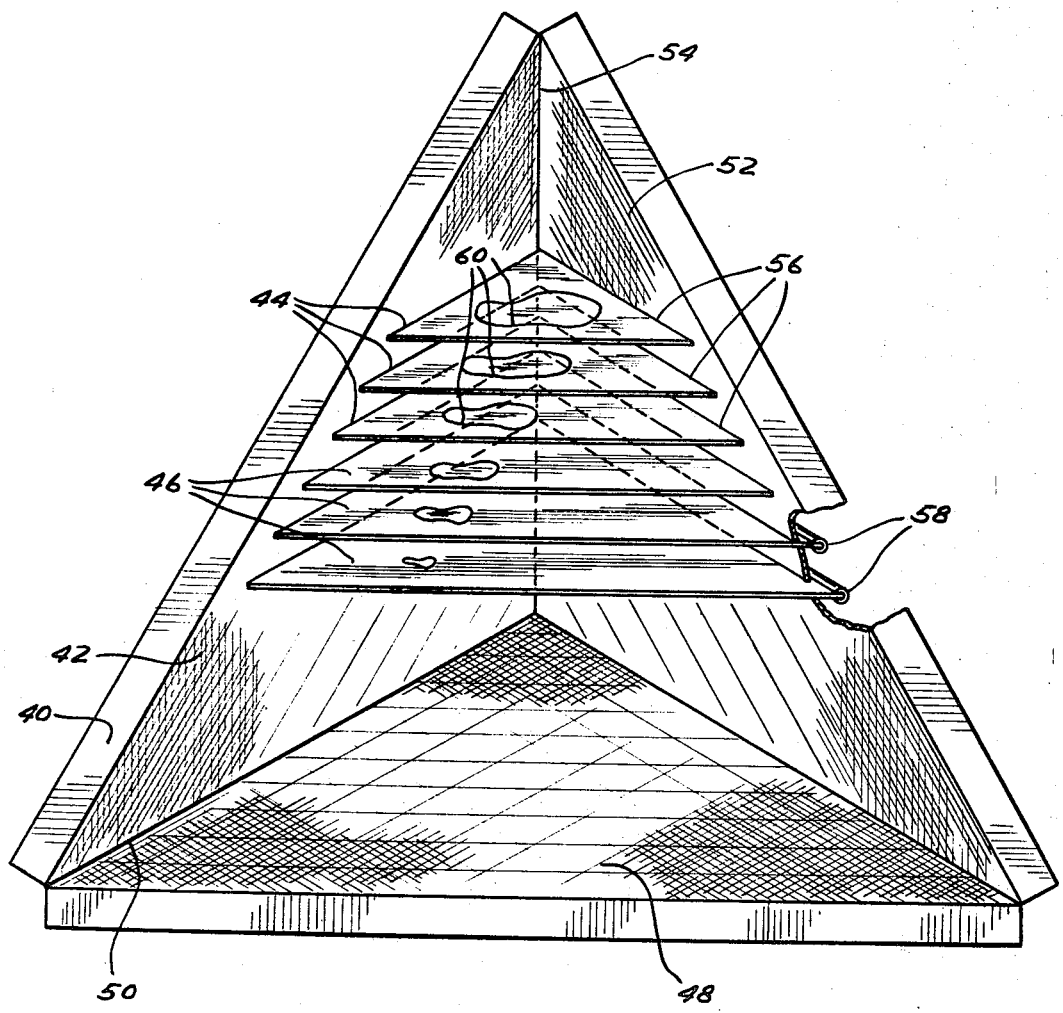
FIGURE 3 is a modified form of the invention in an erected condition.

Refer now to FIGURE 3 showing a modified form of the invention. In FIGURE 3 there is provided a base sheet 40 having printed on it numerical values and lines corresponding to conventional triangular coordinates 42. These will ordinarily be the same as the grid 16. Connected to the base 40 along parallel hinged connection lines 44 are a plurality of parallel marking surfaces 46. Again, each surface 46 is preferably triangular and formed from a stiff transparent material such as plastic sheeting. Each is preferably printed with lines and numbers to provide triangular coordinates. A supporting sheet 48 is connected to the base 40 along a fold line or hinge 50. A spacer 52 is also connected by means of a hinge 54 to an adjacent side of the base 40. The hinges 50 and 54 preferably define an angle of 60°. The spacer 52 is provided with a series of equally spaced cuts 56, each of which receives one of the surfaces 46. In this manner, the entire device can be collapsed when the spacer 52 is folded to the left as seen in the figure and erected when the spacer 52 is folded toward the right. A stop member such as a plastic cylinder 58 is secured to the free edge of each of the surfaces 46 to limit the outward movement of spacer 52. When the device is collapsed, it can be seen that the marking surfaces 46 will be able to move independently of one another so that the curves or other numerical data 60 can be quickly entered.

It is apparent that many modifications and variations of this invention as hereinbefore set forth may be without departing from the spirit and scope thereof. The specific embodiments described are given by way of example only and the invention is limited only by the terms of the appended claims.

I claim:

1. An apparatus for representing numerical functions in three dimensions comprising a base member having a flat surface thereon, a plurality of parallel marking surfaces hinged to the base along parallel lines and a spacer member connected to each of the marking surfaces at a point spaced from the base, the spacer member being hinged to the base, said spacer member having openings therein to receive the marking surfaces, stop means operatively associated between the free ends of the marking surfaces and the spacer member for limiting the deflection of the spacer member away from the base, each of the connections between the spacer and the marking surfaces being equidistant from each other whereby the movement of the spacer to a position adjacent the base will enable all of the marking surfaces to be folded to a collapsed condition and visible markings upon said apparatus providing coordinates for entering numerical data and the like.

2. The apparatus according to claim 1 wherein the base has a grid imprinted upon it, said grid composed of numerals and lines defining triangular coordinates.

3. The apparatus of claim 1 wherein each of the marking surfaces has coordinates imprinted upon it.

References Cited

UNITED STATES PATENTS 2,416,754  3/1947  Horr _____ 35—1
2,917,835  12/1959  Nelson.

FOREIGN PATENTS 741,542  12/1955  Great Britain.

EUGENE R. CAPOZIO, *Primary Examiner.*

W. GRIEB, *Assistant Examiner.*